United States Patent [19]
Thelen

[11] 3,759,604
[45] Sept. 18, 1973

[54] INTERFERENCE FILTER REFLECTING A CERTAIN WAVE LENGTH BAND WITHIN A GIVEN WAVE LENGTH RANGE WHILE LETTING PASS OTHER WAVE LENGTH BANDS OF THE RANGE

[75] Inventor: Alfred Thelen, Triesen, Furstentum, Liechtenstein

[73] Assignee: Balzers Patent-und Beteiligungs AG, Balzers, Furstentum, Liechtenstein

[22] Filed: Sept. 17, 1971

[21] Appl. No.: 181,433

[30] Foreign Application Priority Data
Sept. 18, 1970 Switzerland.................... 13919/70

[52] U.S. Cl. .................................................. 350/166
[51] Int. Cl. .................................................. G02b 5/28
[58] Field of Search .............................. 350/163-166

[56] References Cited
UNITED STATES PATENTS
3,528,726 9/1970 Austin................................ 350/166

FOREIGN PATENTS OR APPLICATIONS
211,597 11/1957 Australia............................ 350/166

Primary Examiner—David Schonberg
Assistant Examiner—Ronald J. Stern
Attorney—John J. McGlew et al.

[57] ABSTRACT

The filter comprises a plurality of alternately high and low refracting light transmitting layers, applied on a light transmitting support, and reflecting a certain wave length band within a given wave length range while letting pass the other wave length bands of the range. The filter includes a periodically symmetrically constructed inner system between two reflection-reducing outer systems each constructed from a group of alternating high and low reflecting layers for the attenuation of undesired secondary reflection bands. The layers of one outer systm group have the same constant index of refraction $n_{const}$ as a first layer group of the inner system. For any other layer of the outer system, having a variable index of refraction $n_i$ differing from $n_{const}$ there is fulfilled the condition that the absolute value of the product $n_{const} - n_i \times d_i$ is less than this product for those inner system layers having an index of refraction differing from $n_{const}$ and wherein $d_i$ is the layer thickness. The constant index of refraction of one group of layers of an outer system may be equal to the index of refraction of the low refracting layers of the inner system or to the index of refraction of the high refracting layers of the inner system.

5 Claims, 12 Drawing Figures

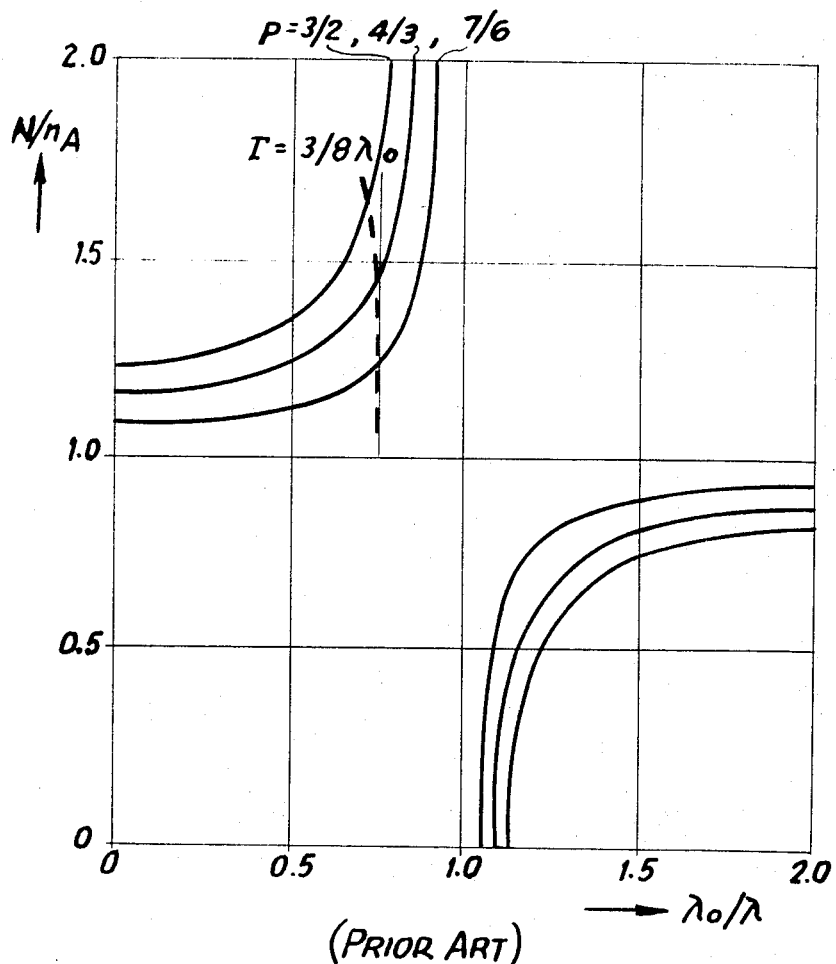
(PRIOR ART)
FIG. 1
(PRIOR ART)
FIG. 3

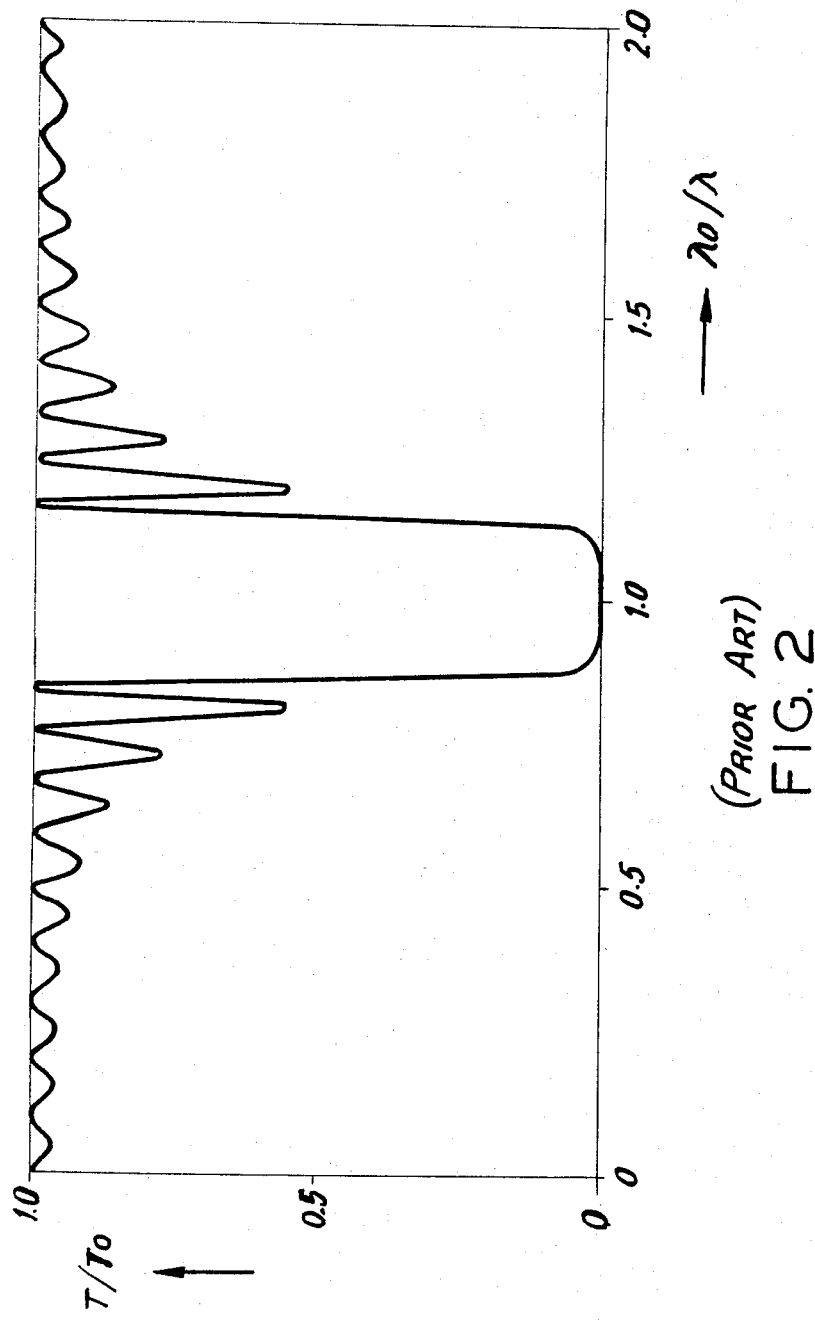
(PRIOR ART)
FIG. 2

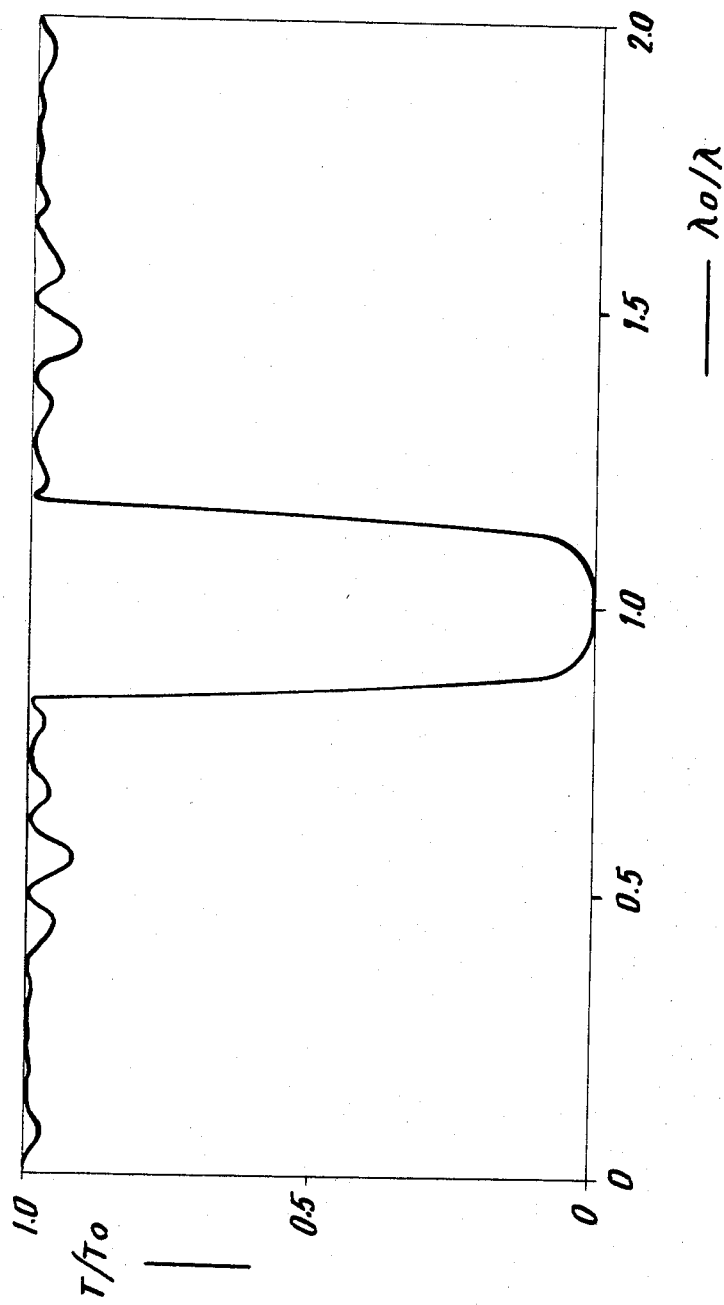
FIG. 4

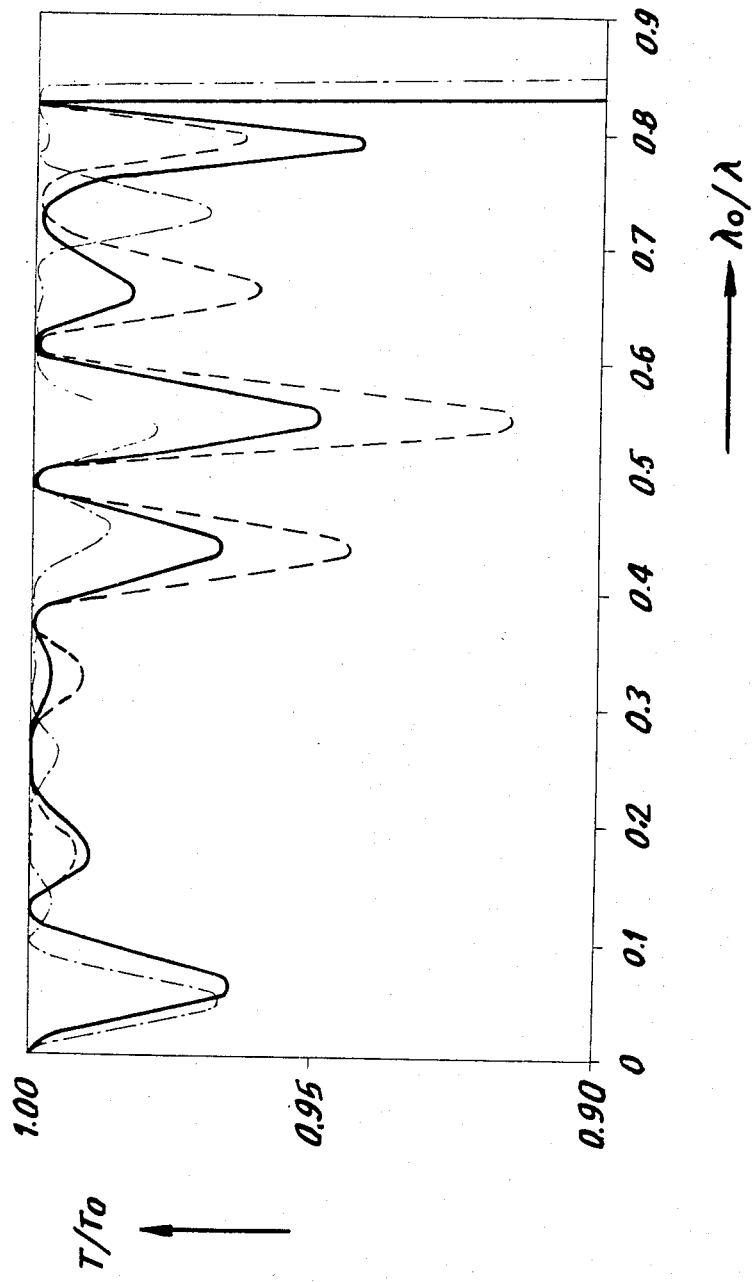
FIG. 5

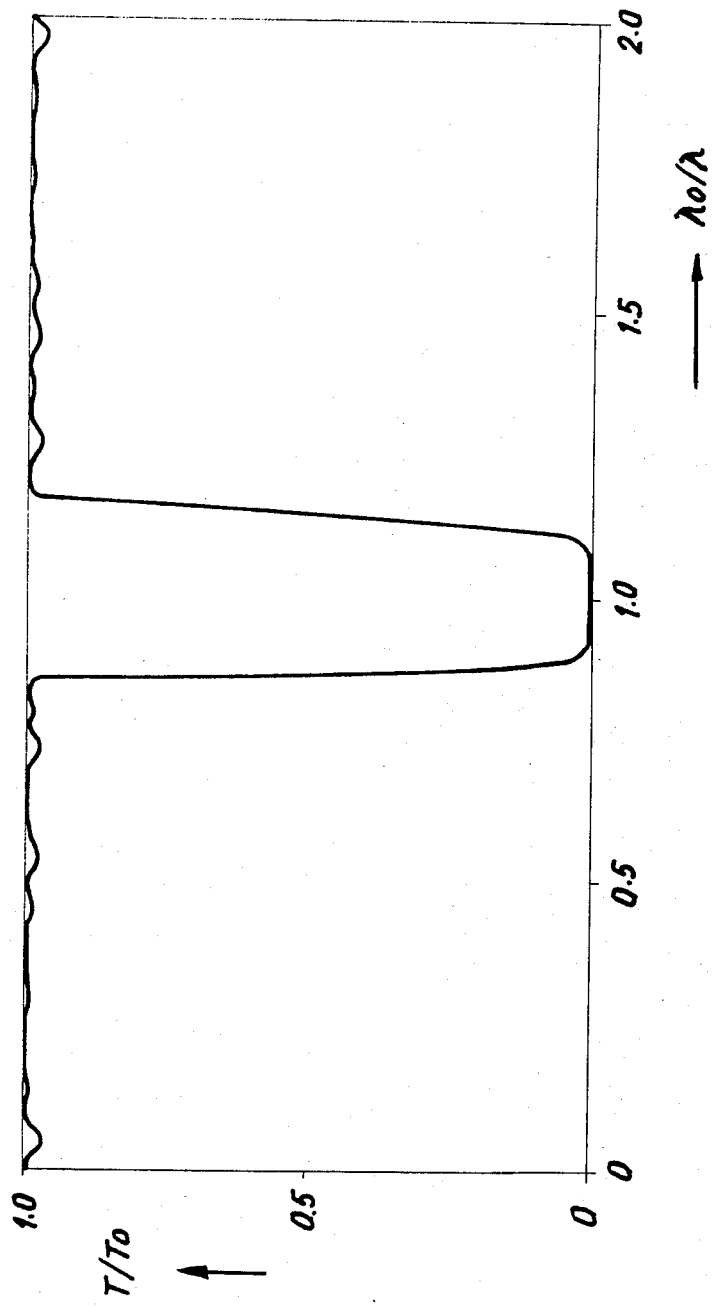
FIG.6

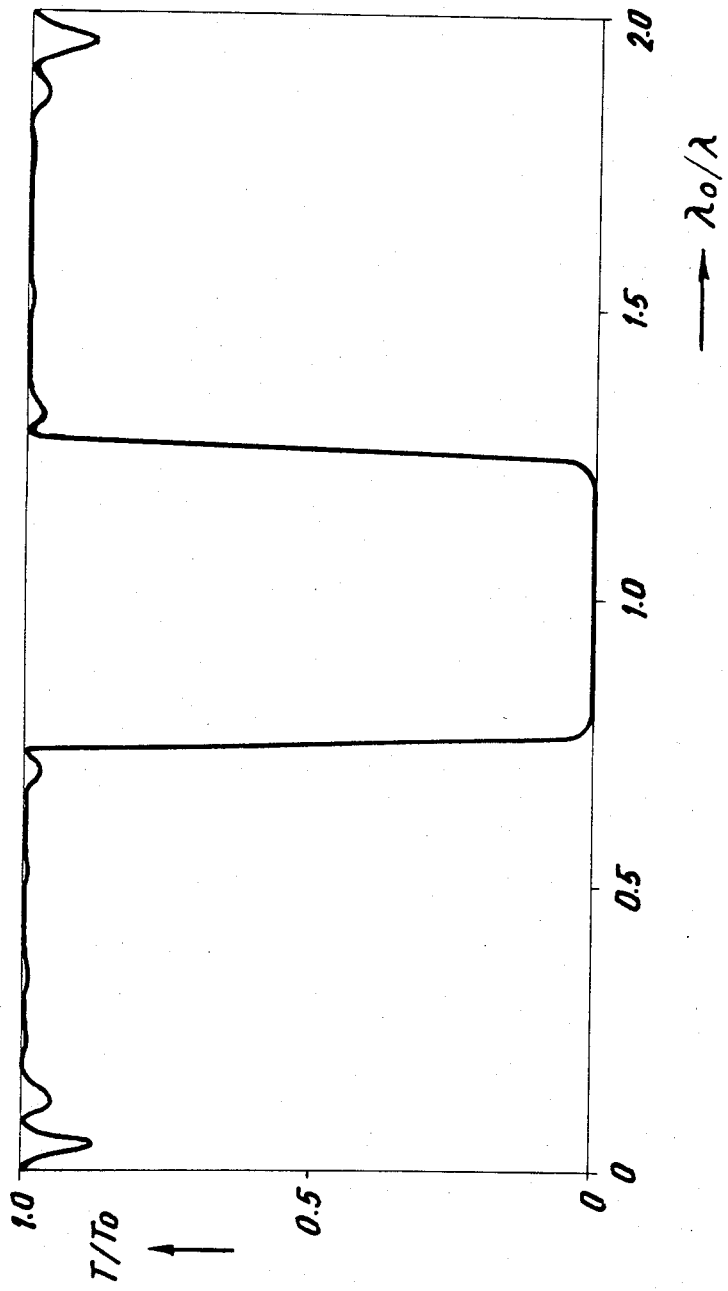
FIG.7

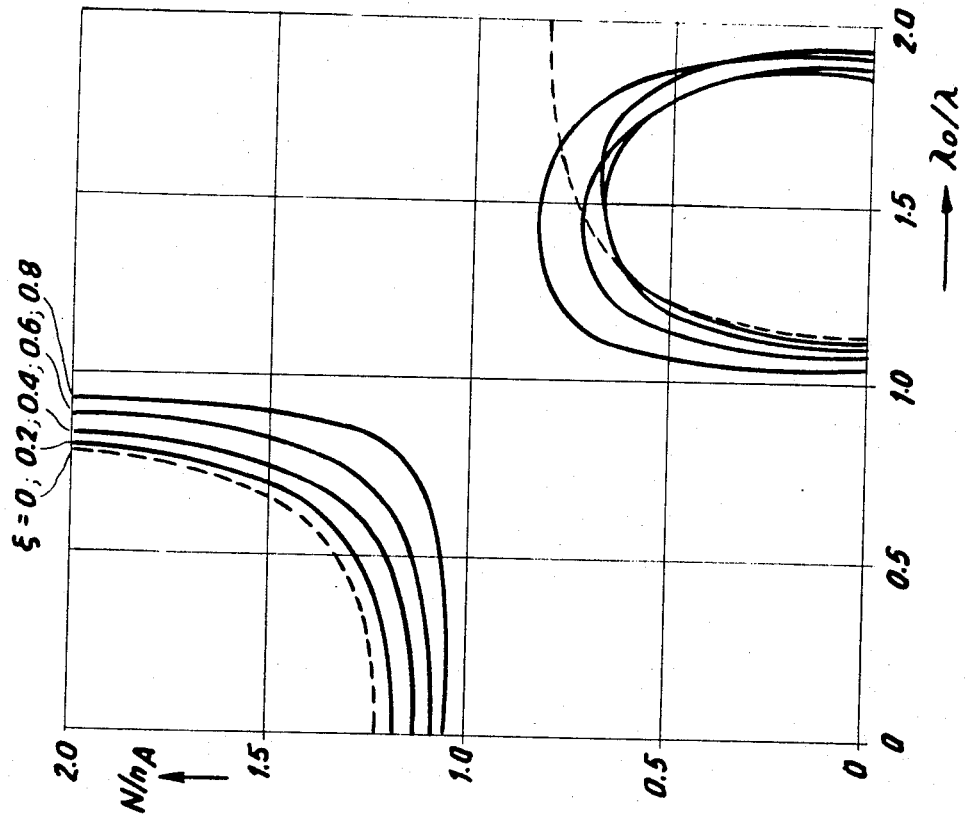
FIG.10
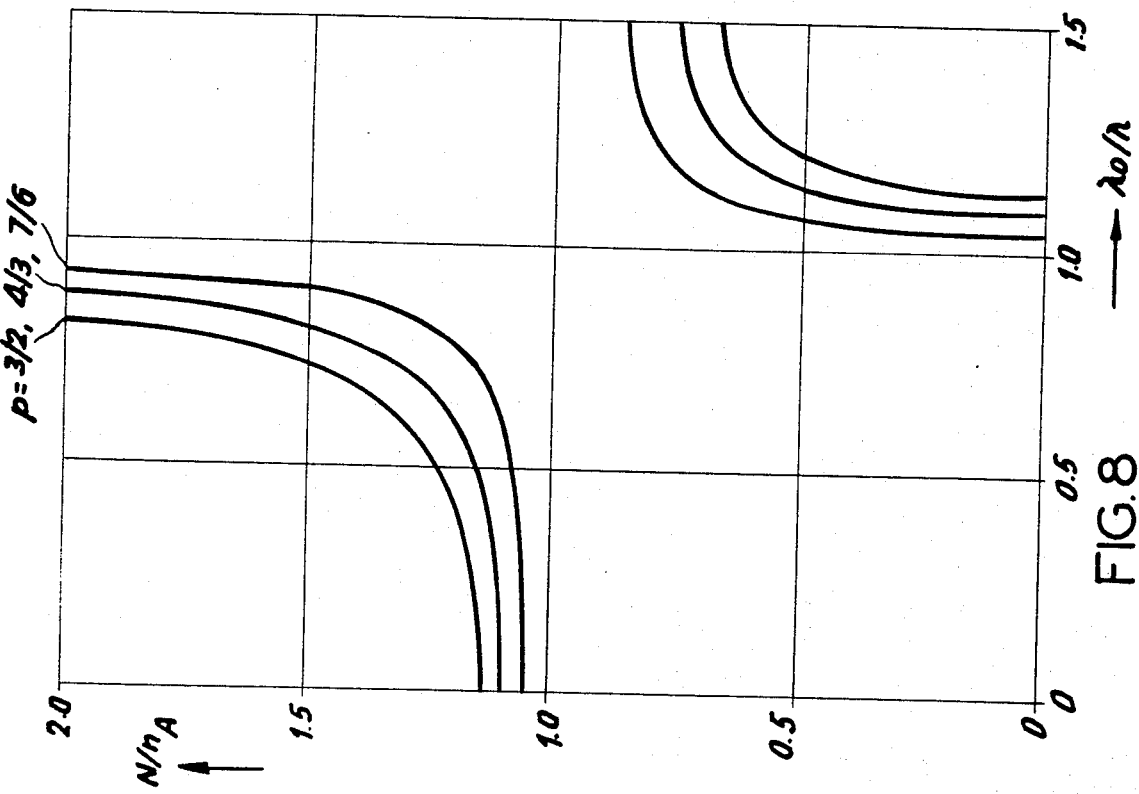
FIG.8

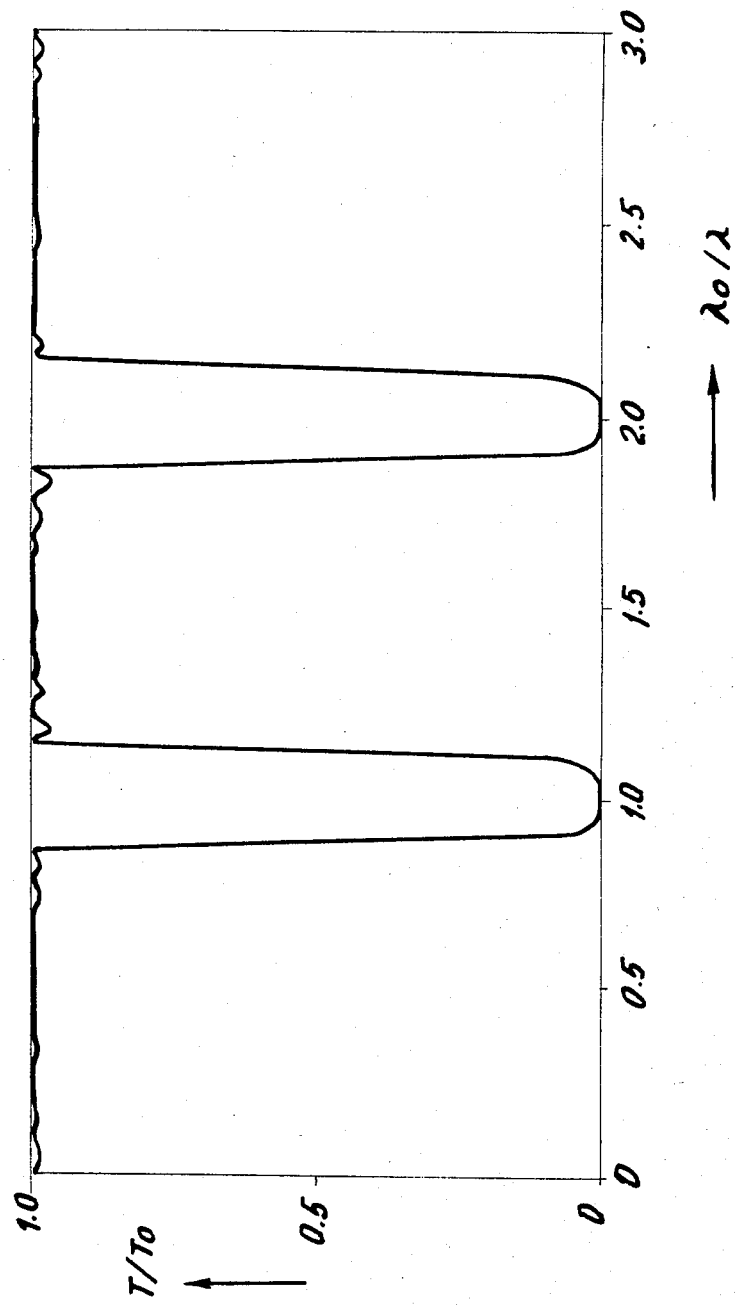
FIG. 9

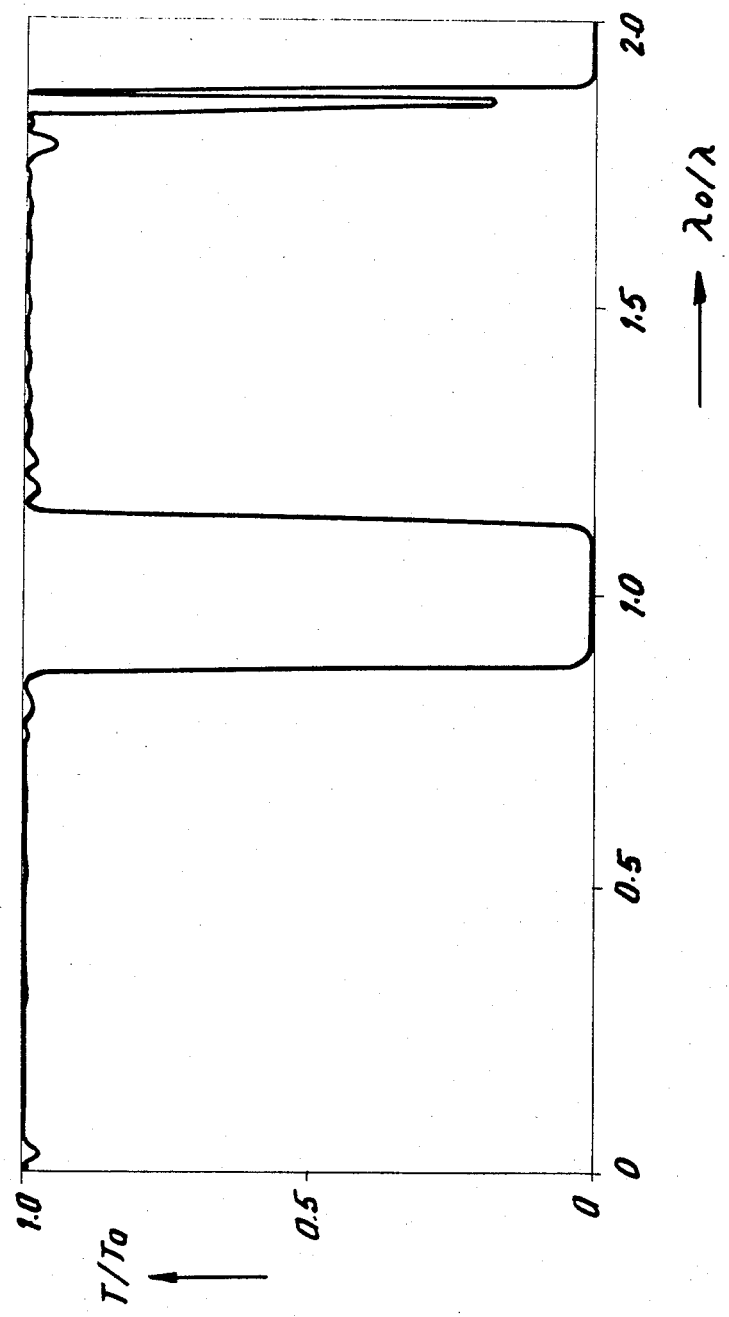
FIG. 11

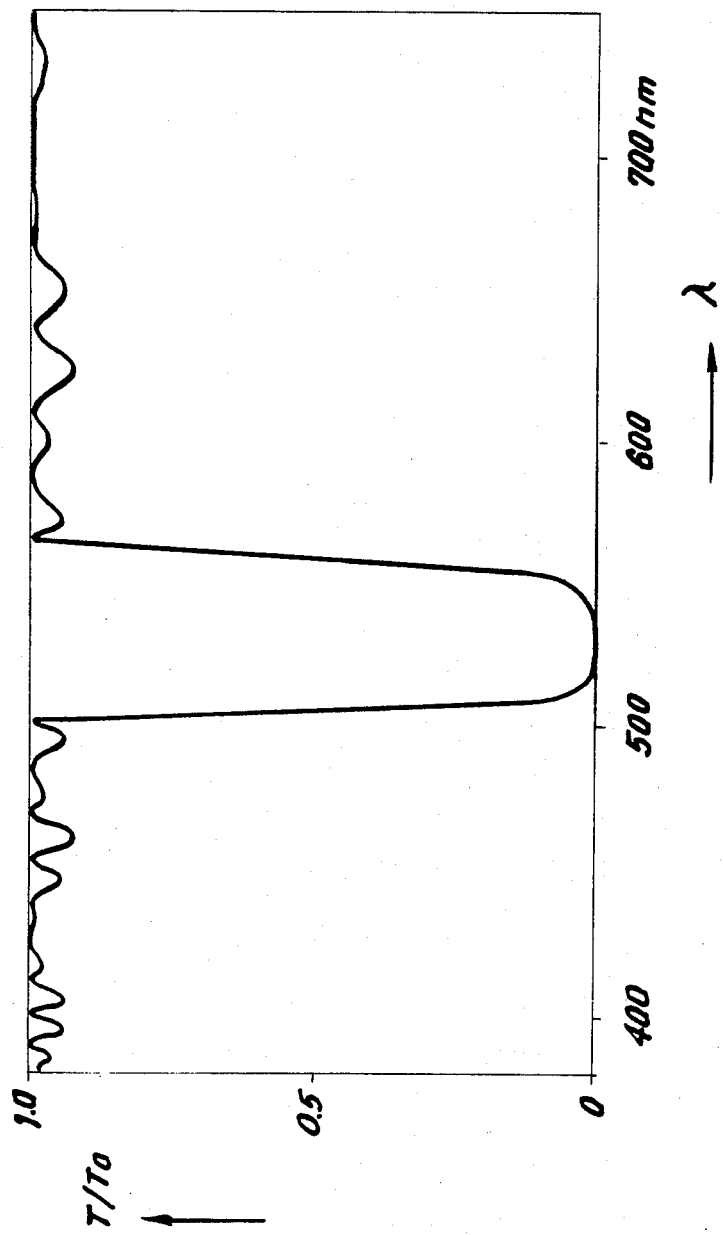
FIG. 12

INTERFERENCE FILTER REFLECTING A CERTAIN WAVE LENGTH BAND WITHIN A GIVEN WAVE LENGTH RANGE WHILE LETTING PASS OTHER WAVE LENGTH BANDS OF THE RANGE

FIELD OF THE INVENTION

This invention relates to so-called minus filters and, more particularly, to a novel and improved minus filter providing for extensive smoothing of the ranges on both sides of the blocking range.

BACKGROUND AND SUMMARY OF THE INVENTION

The present invention relates to so-called minus filters, which are composed of a plurality of alternately high and low refracting thin layers applied on a support. By the term "minus filters", as used herein, there is to be understood optical filters which, within a given wave length range, reflect a certain wave length band but let pass radiation of other wave lengths. In the ideal case, therefore, the light transmission should be, starting from a wave length $\lambda_1$ to a wave length $\lambda_2$, 100 percent: from wave length $\lambda_2$ to wave length $\lambda_3$, 0 percent: and from wave length $\lambda_3$ to wave length $\lambda_4$, again 100 percent. The wave length range from $\lambda_1$ to $\lambda_4$ is then called the operating range of the filter, the ranges from $\lambda_1$ to $\lambda_2$, and from $\lambda_3$ to $\lambda_4$, the pass ranges, and the range from $\lambda_2$ to $\lambda_3$, the blocking range. Such filters find multiple applications in optical technology. For example, they are important for measuring the dispersed light of monochromators.

The basis for most multi-layer interference filters comprises layer stacks built up periodically of high and low refracting layers. For minus filters, there is usually used a layer sequence according to the scheme A/2, B, A, B, ... B, A/2, where A is a layer with the index of refraction $n_A$ and with a thickness of $\lambda_0/4$ of the means wave length $\lambda_0$ of the blocking range, A/2 is a similar layer but of half the thickness of A, namely $\lambda_0/8$, and B is a layer with the index of refraction $n_B$ and a thickness of $\lambda_0/4$. For the layer stack as a whole, there can be stated a so-called equivalent index of refraction N and an equivalent thickness $\tau$ as a function of the wave length. For the equivalent index of refraction, in accordance with the theory, there applies the following equation:

$$N/n_A = \sqrt{\frac{\cos\frac{\pi\lambda_0}{4\lambda}\frac{1-n_B/n_A}{1+n_B/n_A}}{\cos\frac{\pi\lambda_0}{4\lambda}\frac{1-n_B/n_A}{1+n_B/n_A}}} \quad (1)$$

For the equivalent thickness, there applies the following equation:

$$\Gamma = 2\frac{\lambda_0}{\pi}ar\cos\left(1 - \frac{(1+n_B/n_A)^2}{2n_B/n_A}\sin^2\frac{\pi\lambda_0}{4\lambda}\right) \quad (2)$$

In the accompanying drawings, FIG. 1 is a graphic representation of these functions for three different values of the quotient $n_B/n_A$. In wave length ranges where the equivalent index of refraction has a real value, the layer stack behaves like a single layer with the index of refraction N and the thickness $\nu\tau$ with $\nu$ being the number of periods, or layer pairs, of the stack. However, for wave lengths where the equivalent index of refraction becomes imaginary, as is the case in the vicinity of $\lambda_0/\lambda = 1$, as shown in FIG. 2, the layer stack is highly reflecting and each additional period, or layer pair, reduces the transmission in the reflection band further. It will be noted that the curves for the three different refraction value ratios are similar, that is, the equivalent refraction indices have similar dispersion characteristics. From the structure of equation (1), it will be further noted that:

$$N(\lambda_0/\lambda)/n_A = n_A/N(2 - \lambda_0/\lambda) \quad (3)$$

It is known that the transmission of a layer arrangement, of the kind described, on a support with the index of refraction $n_S$ in a surrounding medium with the index of refraction $n_M$ is the same as for an arrangement with the same layer structure where all indices of refraction, including the indices of refraction of the support and of the surrounding medium, are replaced by their reciprocal values multiplied by a certain factor $x$. FIG. 3 schematically illustrates the construction of two such equivalent reciprocal systems.

In practice, the transmission ranges of ordinary multilayer interference filters never meet the stipulated requirements. Instead, due to secondary reflection bands, the transmission curve always shows a certain waviness, and the elimination of such waviness is a main problem in the construction of interference filters. It has been found that this waviness is the more apparent the lower the transmission in the blocking range is, that is, the greater the number of layers of which the filter is constructed. FIG. 2 illustrates the standardized transmission curve of a $\lambda/4$ multi-layer interference filter of 19 layers, where T is the transmitted radiant energy and $T_0$ the incident radiant energy, $\lambda$ the wave length, and $\lambda_0$ the mean wave length of the blocking range. The index of refraction of the low refracting layers is 1.56, and that of the high refracting layers is 2.34. Such a filter, which can be expressed, in abbreviated notation, by the expression 1.56/ H (LH)$^9$ /1.56, with $n_H = 2.34$ and $n_L = 1.56$, is not suitable for many applications in optical technology because of its waviness.

Extensive elimination of this waviness, or so-called smoothing, seems to be possible, according to the prior art, on only one side of the blocking range, but not simultaneously on both sides. It is known that the waviness in a given wave length range can be reduced if it is possible correctly to match phase and reflection capacity for each wave length of the operating range, by means of two groups of auxiliary layers applied on both sides of the basic system. This method, however, is very laborious, as a method consistently to be used for this solution of this problem was not known. While, in the maantime, it has been shown by several authors how filters can be constructed which are well smoothed in a relatively wide wave length range, again there is the restriction that, in a minus filter, only the transmission range on one side of the blocking range, selectively either the short wave or the long wave, could be smoothed. It has been found that an improvement on one side has resulted in a worsening on the other side.

In contradistinction, the objective of the present invention is to provide a layer construction, for a minus filter, which permits extensive smoothing on both sides of the blocking range.

The interference filter of the invention, comprising a plurality of alternately high and low refracting light-transmitting layers, applied on a light transmitting support, reflecting a certain wave length band within a given wave length range while letting pass the radiation of the other wave lengths of this range, comprises a periodically symmetrically constructed inner system between two reflection-reducing outer systems composed of a group of high refracting and a group of low refracting alternating layers to attenuate undesired reflection bands. In accordance with the invention, the layers of one of the groups of outer systems have the same constant index of refraction $n_{const}$ as a first layer group of the inner system and, for any other layer with a variable index of refraction $n_i$ of the outer systems differing from $n_{const}$, there is fulfilled the condition that the absolute value of the product $|n_{const} - n_i| \times d_i$ is smaller than this product for the layers of the inner system having an index of refraction differing from $n_{const}$, with $d_i$ being the layer thickness. Such a filter can be realized in the following steps:

1. There is selected the two layer substances for the layers of the periodic layer stack A/2, B, A, B, . . . B, A/2, of the inner system.

2. There is determined the number $\nu$ of the periods of the inner system required to obtain the desired blocking range according to the following equations:

$$T_{RB} \approx 4 \cdot (n_S n_M / n_A^2) \cdot (v_B/v_A)^{2\nu} \, n_A > n_B \quad (4)$$

$$T_{RB} \approx 4 \cdot (v_A^2 / n_S n_M) \cdot (v_A/v_B)^{2\nu} \, m_B > m_A \quad (5)$$

where $T_{RB}$ is the transmission at the reference wave length $\lambda_0$ in the center of the reflection band.

3. There is calculated the transition layers to be applied symmetrically on opposite sides of the above layer stack, in such a way that, for radiation of the wave $\lambda_0$, these layers would have a reflection-free transmission between the medium $n_A$, provided for the embedment of the entire layer arrangement, and the inner system, with the equivalent index of refraction N.

The filter as thus calculated can be produced by known techniques, such as preferably by vapor deposition of the layers under vacuum. Hereinafter, it will be shown how, in a development of the invention, the requirement of the embedment of the entire layer arrangement in a medium, equal on both sides and with the index of refraction $n_A$, can be circumvented. It should be noted that the smoothing of the two transmission ranges of a negative filter, in accordance with the invention, is based on the fact that the strong dispersion of the index of refraction N, which results for the periodic layer stack, is approximately compensated by the similar dispersion of the two outer systems on both sides of the reflection band. As this compensation, however, can be complete only for a specific wave length pair, the correct selection of the reference wave lengths, in the calculation of the outer systems, is of great importance, and it is advisable to calculate the outer systems for different wave lengths and to select the case which is best for a certain application.

For an understanding of the principles of the invention, reference is made to the following description of typical embodiments thereof as graphically illustrated in the accompanying drawings:

BRIEF DESCRIPTION OF THE DRAWINGS

In the drawings:

FIGS. 1, 2 and 3 are graphical representations of prior art interference filter constructions; and FIGS. 4 through 12 are graphical representations of interference filter constructions embodying the invention.

DESCRIPTION OF THE PREFERRED EMBODIMENTS

In the following description of embodiments of invention, there is used the usual abbreviated notation for the representation of layer structures. In this abbreviated notation, the first number (if stated) is the index of refraction of the medium on one side of the layer system, 1.56 being, for example, a glass with the index of refraction 1.56. The designations A, A1, A2, . . . B, B1, B2 . . . etc. indicate different layers with the refractive values $n_A, n_{A1}, n_{A2} \ldots n_B, n_{B1}, n_{B2} \ldots$, etc. The thickness of these layers is established beforehand and, in connection with the following description, there are always meant layers of $\lambda/4$ optical layer thickness, $\lambda$ being a reference wave length, and the optical layer thickness being defined, as is known, by the product of index of refraction and geometric thickness.

Expressions such as A/2, B/2, B1/2, B2/2, etc. mean the respective layers but of half the optical layer thickness, that is, in the present description, $\lambda/8$ instead of $\lambda/4$. A term in parenthesis, for example, (A/2, B/2, A/2) means a layer sequence with the respective layer, and a raised index or power indicates that the layer sequence stated in the parenthesis is repeated the respective number of times. It should be noted that, with such a repetition, layers of the same type may be contiguous, for example, two A/2 layers, which together, may be regarded as a single layer of the thickness A. Instead of $(A/2, B, A/2)^3$, there might therefore be written A/2 B A B A B A/2. For the representation of symmetrical layer structures with many layers, the first-named notation is often more practical. The number indicated last in an expression means the index of refraction of the contiguous medium on the other side of the layer system.

In the following, a first embodiment of the invention is described in greater detail. There is taken, for the inner system, a symmetrical layer stack with six periods ($\nu = 6$), with low refracting layers with the index of refraction $n_A = 1.56$ and high refracting layers with the index of refraction $n_B = 2.34$. That is, there is a stack of a total of 13 layers with the construction A/2 B A B A B A B A B A B A/2, which may be written also as $(A/2, B, A/2)^6$. According to the aforementioned formulae, this inner system has an equivalent index of refraction N and an equivalent total thickness $\nu T$.

For the outer system providing a reflection-free transition between this inner system and an embedding medium with the index of refraction $n_A$, there is selected, in this example, again a periodic layer system which is equivalent to a reflection-reducing single layer. As is known, there applies for such a single-layer reflection reduction the following equation:

$$N(n_{A\,1} - n_{B2}) = \sqrt{n_A \cdot N(v_{A1} n_{B1})} \quad (6)$$

where N ($n_{A1} n_{B1}$) is the equivalent index of refraction of the inner system, and $n_A$ the index of refraction of the contiguous medium with N ($n_{A1} n_{B2}$) the index of refraction of the reflection-reducing single layer, or here, the equivalent index of refraction of the outer system equivalent to such a single layer. The thickness of a reflection-reducing single layer would have to be $\lambda/4$, or an odd multiple thereof. This means that, for the outer system, a corresponding equation must apply in the present example.

In order to obtain a good smoothing of the transmission curve, especially in the portions of the transmission range contiguous to the blocking range, which is of particular importance in many applications, there is selected, as the reference wave length $\lambda_0$ for the calculation of the outer systems, that wave length for which the periodic layer stack shows an equivalent thickness of $\tau = 3 \lambda_0/8$.

By insertion of $n_A = 1.46$, $n_B = 2.34$, and $\tau = 3 \lambda_0/8$ in equation 2, there is calculated $\lambda_0/\lambda = 0.72$, and, using equation 1, there is found, for this ratio, the equivalent index of refraction $N(n_A, n_B) = 1.95$. From equations (6) and (1) there is then obtained, for $n_{B2}$, the value 1.91. As the band width of a single layer reflection reduction is not very great, and the smoothing is to be obtained especially in the vicinity of the reflection band, the layer sequence A/2 B2 A/2 must be used twice. FIG. 4 illustrates the transmission curve of the resulting overall arrangement.

According to the above statements, and in the usual abbreviated notation, its construction is:

1.56/ (A/2 B2 A/2)$^2$ (A/2 B1 A/2)$^6$ (A/2 B2 A/2)$^2$ / 1.56 with $n_A = 1.56$, $n_{B1} = 2.34$ and $n_{B2} = 1.91$.

Among the embodiments according to the invention, the layer construction is particularly simple in those where either the index of refraction of the high refracting layers, or that of the low refracting layers, of the inner system, is equal to the index of refraction of the embedment medium. Especially advantageous solutions result when the outer systems are so determined that the difference of the refraction value of adjacent low-refracting and high-refracting layers gradually diminishes outwardly within the outer system, starting from the constant value of this difference in the inner system, and reaches the smallest value with the layers contiguous to the embedment medium.

FIGS. 5 and 6 illustrate two examples of this kind. The example of FIG. 5 has the construction:

1.56 / (A/2 B3 A/2) (A/2 B2 A/2) (A/2 B1 A/2)$^6$ (A/2 B2 A/2) (A/2 B3 A/2) / 1.56 with $n_A = 1.56$, $n_{B1} = 2.34$, $n_{B2} = 1.95$, and $n_{B3} = 1.86$.

The example of FIG. 6 has the following construction:

1.56 / (A/2 B5 A/2) (A/2 B4 A/2) (A/2 B3 A/2) (A/2 B2 A/2) (A/2 B1 A/2)$^6$(A/2 B2 A/2) (A/2 B3 A/2) (A/2 B4 A/2) (A/2 B5 A/2) / 1.56 with $n_A = 1.56$, $n_{B1} = 2.34$, $n_{B2} = 2.10$, $n_{B3} = 2.02$, $n_{B4} = 1.85$, $n_{B5} = 1.74$.

In FIG. 5, only the long-wave side of the transmission curve ($\lambda_0/\lambda > 1$) is represented and, for comparison, there are entered, in addition, the corresponding curves of the embodiments 4 (———) and 6 (-.-.-.-.-). Examples 6, 5 and 4 illustrate, as can be seen from the construction scheme, four-stage, two-stage, and single-stage outer systems for the transition from the inner system to the embedment medium, equal on both sides, and correspondingly also the waviness of the mentioned systems is different.

A four-stage outer system is also shown in the example of FIG. 7, and has the following construction:

4.00 / (A/2 B5 A/2) (A/2 B4 A/2) (A/2 B3 A/2) (A/2 B2 A/2) (A/2 B1 A/2)$^6$ (A/2 B2 A/2) (A/2 B3 A/2) (A/2 B4 A/2) (A/2 B5 A/2) / 4.00 with $n_A = 4.00$, $n_{B1} = 1.80$, $n_{B2} = 1.99$, $n_{B3} = 2.35$, $n_{B4} = 2.96$, $n_{B5} = 3.61$.

It should be noted that this particular filter was embedded in a high-refracting medium having an index of refraction 4.

The invention can be applied also to inner systems which are not constructed from $\lambda/4$ layers. FIG. 8 illustrates the equivalent index of refraction of a layer structure A-B-A for three different refraction value ratios. As can be seen, these curves are quite similar to those of FIG. 1. Since, however, in this case, equation (3) is no longer applicable, the reflection-reducing outer systems must be found by other means. A simple possibility is to use for the outer systems a structure similar to that of the inner systems (A-B-A), but with $n_B$ in the outer system decreasing linearly from the interior outwardly. The following is an example of such a filter:

1.56 / (A B5 A) (A B4 A) (A B3 A) (A B2 A) (A B1 A)$^6$ (A B2 A) (A B3 A) (A B4 A) (A B5 A) /1.56 with $n_A = 1.56$, $n_{B1} = 2.34$, $n_{B2}$ 2.184, $n_{B3} = 2.028$, $n_{B4} = 1.872$, and $n_{B5} = 1.716$.

FIG. 9 illustrates the transmission curve of this filter. The last-mentioned construction method can be applied to all refraction value ratios and also to periodic layer arrangements with more than two layer materials.

The examples so far described require several layer substances. In practice, this entails a certain disadvantage, because layer materials which are satisfactory not only with regard to their optical properties but also with regard to their vapor-depositional and mechanical properties are available in only a limited number. It is possible to replace, in a layer system, layers of a given refraction value by layers of a different refraction value, but with changed thickness.

FIG. 10 illustrates the standardized equivalent index of refraction of the following layer structure:

$aA/2$ $bB$ $aA/2$ with $n_B/n_A$ = const. = 1.5 and $\zeta = (b-a)/(b+a) = 0, 0.2, 0.4, 0.6, 0.8$, $a$ and $b$ being ratios whose absolute values are not fixed, with constant refraction value ratio but different thickness ratio. For $\lambda_0/\lambda$ less than 1.6, these curves are comparable with those of FIGS. 1 and 8, leading to a layer system with the structure 1/56 / ($a_1A/2$ $b_1$ $B$ $a_1$ $A/2$) ($a_2$ $A/2$ $b_2$ $B$ $a_2$ $A/2$) ... ($a_{10}$ $A/2$ $b_{10}$ $B$ $a_{10}$ $A/2$) ... ($a$ $A/2$ $b_1$ $B$ $a_1$ $A/2$) /1.56 with $n_A = 1.56$ and $n_B = 2.34$ and $a_1$ $a_{10}$ = 1.0 and $b_1$ = 0.10, $b_2 = 0.20$, .... $b_{10} = 1.00$.

The transmission curve of this particular example is illustrated in FIG. 11. The disadvantage of this solution, which requires only two different layers of material, is, however, that a larger number of transition layers is needed.

In the above examples, the point of departure was that the layer system is embedded in a medium which is equal on both sides, whose index of refraction coincides with the index of refraction of either the high-refracting or the low-refracting layers of the inner system. This condition, which cannot always be met in practice, can be circumvented by inserting additional reflection-reducing layers between the mentioned outer systems and the adjacent media, and not fulfilling the mentioned condition. The calculation of these additional reflection-reducing layers, which must be determined so that a reflection-free transition between the outer systems and the adjacent media, of any desired index of refraction, is obtained, is effected in a known manner analogously to the above-described method for the determination of the reflection-reducing outer systems.

FIG. 12 illustrates the transmission curve of a minus green filter, based on a construction similar to that of FIG. 4 but where the adjacent media are constituted by glass, as the support, and air. The example illustrated in FIG. 12 has the following structure:

1.52 / $(3B2\ 3A)^2\ (3B1\ 3A)^6\ (3B2\ 3A)^2 B2\ B2\ B3$ / 1.00 with $n_A = 1.56$, $n_{B1} = 2.34$, $n_{B2} = 1.91$, $n_{B3} = 1.38$, and $\lambda_0 = 530$nm In all the examples, the structure of the filter is stated, and the structure is defined by the thicknesses and refraction indices of the layers. The invention relates only to this structure, and not to the question of how an individual layer of a certain thickness and a certain index of refraction is produced. For the refraction indices mentioned in the examples, the specialist in the art has corresponding layer materials at his disposal. As mentioned above, vapor deposition under vacuum presently consitutes the most common method for the application of the layers on corresponding supports, usually glass plates. However, the layer structures according to the invention can be realized naturally also with other layer production methods, for example, by cathode sputtering of the layer materials or by chemical depositions. With respect to the technology of layer production, there is an extensive trade literature. As an example, there may be mentioned "Handbook of Thin Film Technology" by Leon I. Maissel and Reinhard Glang, published by McGraw-Hill Book Company in 1970.

While specific embodiments of the invention have been shown and described in detail to illustrate the application of the principles of the invention, it will be understood that the invention may be embodied otherwise without departing from such principles.

What is claimed is:

1. In an interference filter comprising a plurality of alternately high and low refracting light transmitting layers, applied on a light transmitting surface, reflecting a certain wave length band within a given wave length range while letting pass other wave length bands of the range, which filter includes a periodically symmetrically constructed inner system between two reflection-reducing outer systems each constructed from alternating high and low refracting layers, where all low refracting layers form one group of the outer systems and all high refracting layers form another group of the outer systems, and wherein all low refracting layers of said inner system form a first group and all high refracting layers of said inner system form a second group, for the attenuation of undesired secondary reflection bands: the improvement comprising the layers of one outer system group having the same index of refraction $n_{const}$ as one layer group of said inner system and each other layer of the outer systems having an index of refraction $n_i$ differing from $n_{const}$, and fulfilling the condition that the absolute value of the product $|n_{const} - n_i| \times d_i$ is less than this product for the other group of inner system layers having an index of refraction differing from $n_{const}$, where $d_i$ is the layer thickness.

2. In an interference filter, the improvement claimed in claim 1, in which the index of refraction of one group of layers of the outer sytems is equal to the index of refraction of the low-refracting layers of the inner system.

3. In an interference filter, the improvement claimed in claim 1, in which the index of refraction of one group of layers of the outer systems is equal to the index of refraction of the high-refracting layers of the inner system.

4. In an interference filter, the improvement claimed in claim 1, in which the outer systems have the layer sequence A/2, B1, A, B1, A/2, where A is a layer of $\lambda/4$ optical thickness and B1 is a layer with a different index of refraction but also having $\lambda/4$ optical thickness, $\lambda$ representing the wave length of minimum transmission of the filter.

5. In an interference filter, the improvement claimed in claim 1, in which the absolute value of the product $n_{const} - n_i\ d_i$, for the additional layers of the outer system differing in their index of refraction from $n_{const}$ of one group of layers thereof, decreases from the interior outwardly.

* * * * *